P. H. THOMAS.
VAPOR ELECTRIC APPARATUS.
APPLICATION FILED OCT. 19, 1911.

1,197,686.

Patented Sept. 12, 1916.
4 SHEETS—SHEET 1.

P. H. THOMAS.
VAPOR ELECTRIC APPARATUS.
APPLICATION FILED OCT. 19, 1911.

1,197,686.

Patented Sept. 12, 1916.
4 SHEETS—SHEET 2.

WITNESSES:
Chas. F. Clagett
Thos. H. Brown

INVENTOR
Percy H. Thomas
BY
Charles A. Terry
ATTORNEY

P. H. THOMAS.
VAPOR ELECTRIC APPARATUS.
APPLICATION FILED OCT. 19, 1911.

1,197,686.

Patented Sept. 12, 1916.
4 SHEETS—SHEET 3.

WITNESSES:
Chas. F. Clagett
Thos. H. Brown

INVENTOR
Percy H. Thomas
BY
Charles A. Terry
ATTORNEY

P. H. THOMAS.
VAPOR ELECTRIC APPARATUS.
APPLICATION FILED OCT. 19, 1911.

1,197,686.

Patented Sept. 12, 1916.
4 SHEETS—SHEET 4.

Witnesses:
Thos. H. Brown
Harold C. Woodward

Inventor
Percy H. Thomas
by Charles A. Terry
Atty.

UNITED STATES PATENT OFFICE.

PERCY H. THOMAS, OF UPPER MONTCLAIR, NEW JERSEY, ASSIGNOR TO COOPER HEWITT ELECTRIC CO., OF HOBOKEN, NEW JERSEY, A CORPORATION OF NEW JERSEY.

VAPOR ELECTRIC APPARATUS.

1,197,686.  Specification of Letters Patent.  Patented Sept. 12, 1916.

Application filed October 19, 1911. Serial No. 655,606.

*To all whom it may concern:*

Be it known that I, PERCY H. THOMAS, a citizen of the United States, and resident of Upper Montclair, county of Essex, State of New Jersey, have invented certain new and useful Improvements in Vapor Electric Apparatus, of which the following is a specification.

My invention relates to means for exciting rectifiers which require continuity of current flow such, for example, as mercury vapor rectifiers. I here utilize instead of the usual direct current inductances either inductances so located as to be traversed by alternating current or storage devices which have the characteristic of discharging stored energy in the direction opposite to the charging direction, for example such devices as storage batteries and electro-static condensers. I further show various systems whereby the storage and discharge of the electrical energy for keeping alive purposes is continuous and automatic and requires no change of connections. For further detail as to the operation of these rectifiers and further description of various circuits, reference is made to the description of the several figures of the drawings in the present application.

Figure 1:
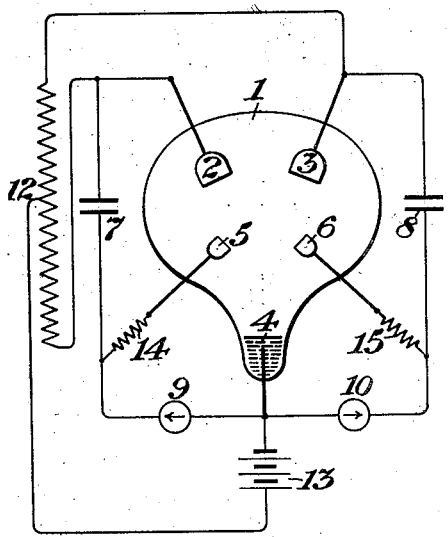
Figure 2:
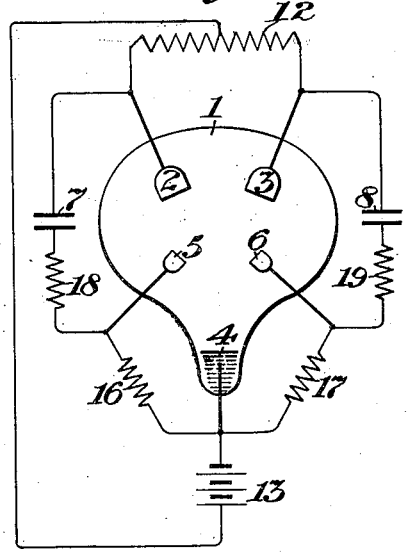
Figure 3:
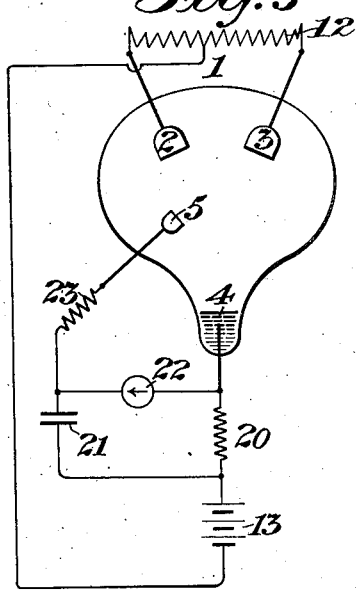
Figure 4:
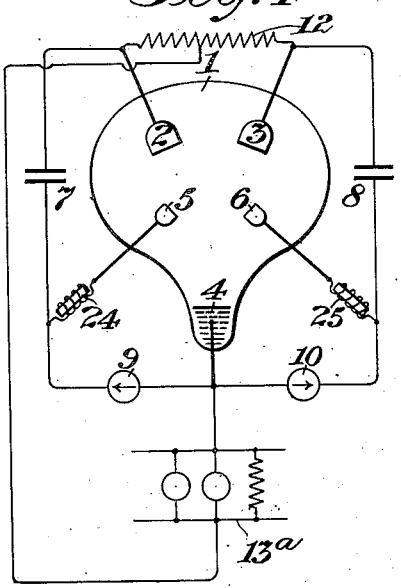
Figure 5:
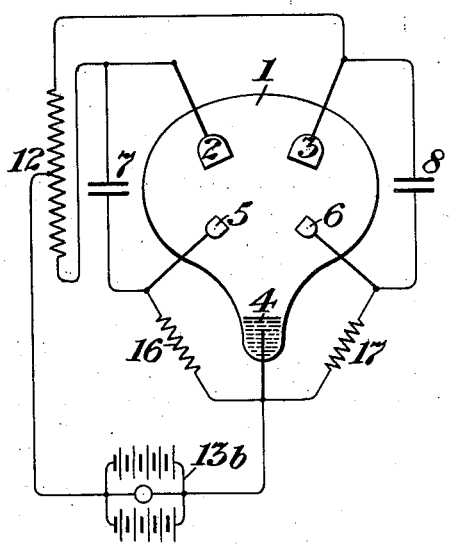
Figure 6:
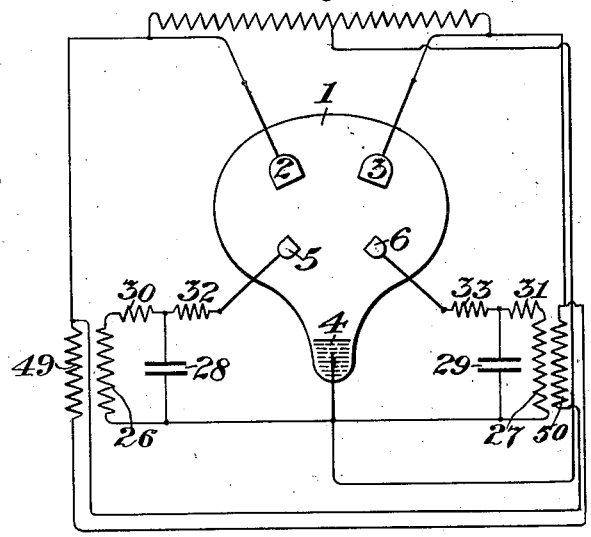
Figure 7:
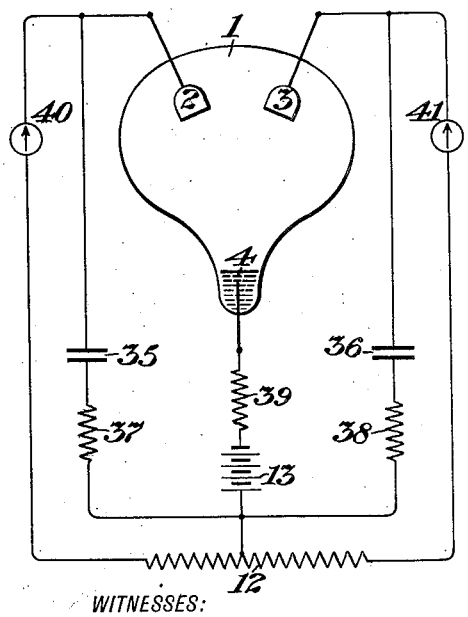
Figure 8:
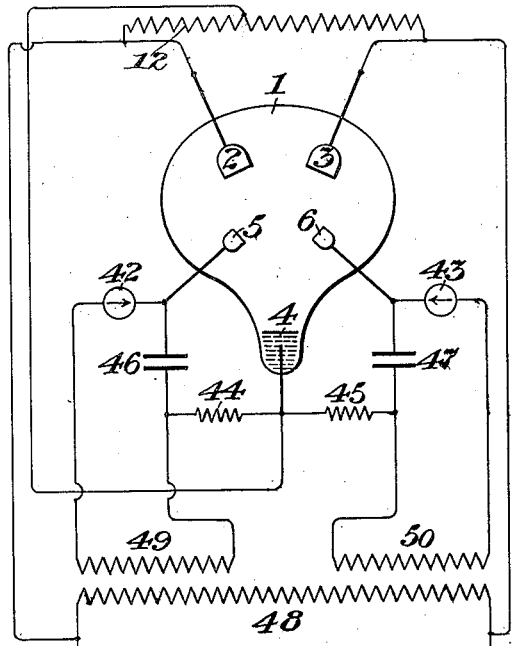
Figure 9:
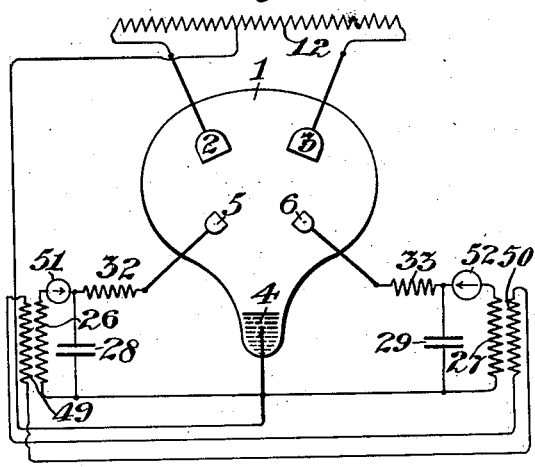
Figure 10:
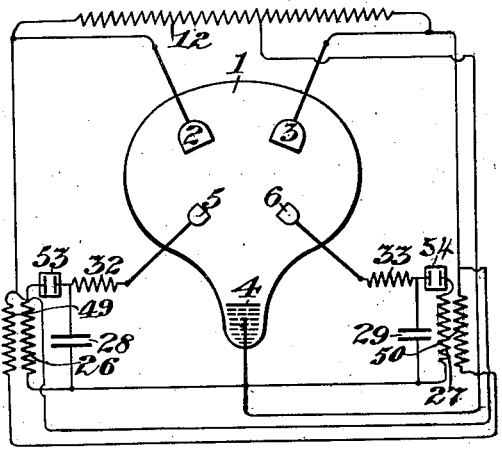
Figure 11:
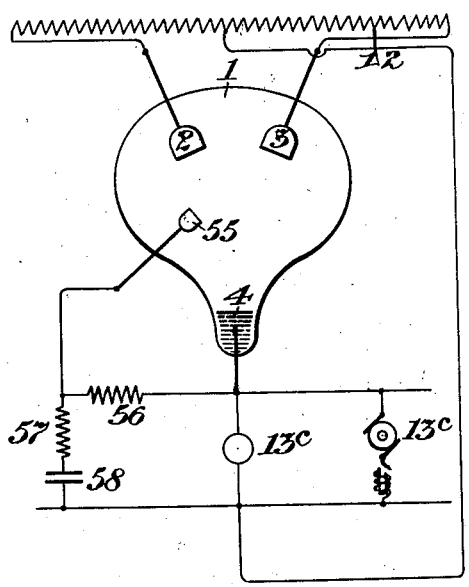
Figure 12:
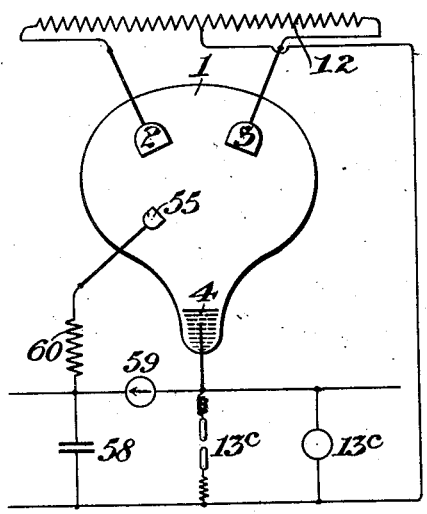
Figure 13:
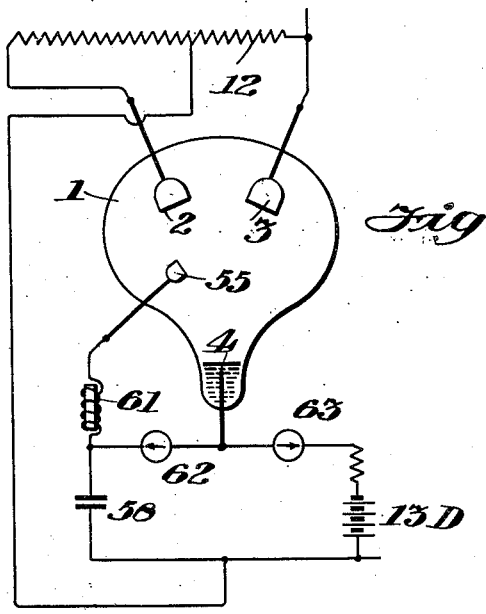
Figure 15:
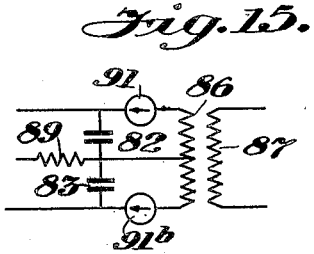
Figure 16:
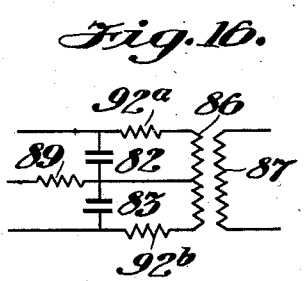
Figure 14:
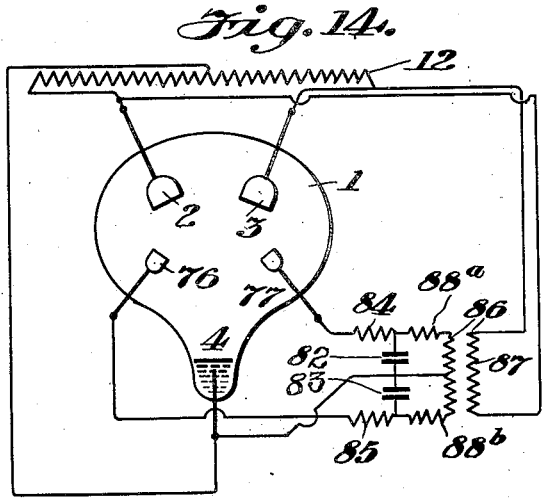

In the following drawings, Figure 1 shows a symmetrical rectifier with exciting circuits operating through two auxiliary electrodes. Figs. 2 and 4 show a similar rectifier system with variation of control resistances. Fig. 3 shows a system utilizing a single auxiliary electrode. Fig. 5 shows a modification of Fig. 1. Fig. 6 shows a modification of Fig. 1 in which a supplementary source of electro-motive force is used for purposes of excitation. Fig. 7 shows a symmetrical form of exciting circuit requiring no auxiliary electrodes. Fig. 8 is a modification of Fig. 6. Figs. 9 and 10 are modifications of Fig. 6. Figs. 11 and 12 are modifications of Fig. 3, an exciting circuit being charged in parallel with the load circuit. Fig. 13 is still another modification of Fig. 3. Figs. 14, 15 and 16 show variations in the form of exciting circuits in rectifiers having a supplementary alternating supply.

In Fig. 1, 1 is the exhausted container, which may be of glass, porcelain, metal, iron, or other suitable material or combination of materials; 2 and 3 are the main anodes, and 4, the cathode, the latter frequently being of mercury though other suitable materials may be used. The supply, which may be a transformer secondary, is shown at 12 and the load circuit, here shown as a storage battery, at 13. 5 and 6 are auxiliary anodes and 7 and 8 are electro-static condensers. 9 and 10 are devices permitting the passage of current in one direction only, and may be the so-called electrolytic rectifiers. Such devices may be made by using one iron and one aluminum electrode immersed in a suitable electrolyte under which conditions current will flow only from the iron electrode. At 14 and 15 I have shown resistances, though reactances may be substituted therefor. The operation of this system may be briefly described as follows: During one alternation of the supply, current will flow from the upper half of the tranformer winding 12 through anode 3, cathode 4, the work circuit 13 back to the starting point. Current will also flow at the same time from the upper half of the transformer winding 12, anode 3, cathode 4, one-way device 9 to the condenser 7 and thence to the lower half of the supply 12. Current cannot flow from the anode 3 to the anode 5 on account of the starting reluctance of the anode 5. This second current will store electricity in the condenser 7. As the main current drops in value the charge in this condenser will flow out in the opposite direction through the resistance or reactance 14, the anode 5, the cathode 4, the load circuit 13, back to the source. This discharge current cannot pass through device 9 since it is impressed in the wrong direction. If the parts including the resistance 14, be properly proportioned, the discharge of electricity from the condenser 7 will maintain a flow of current through anode 5 and the cathode 4 until a current flows during the next alternation through a path from the lower half of the winding 12 to the anode 2, the cathode 4, the work circuit 13, back to the middle point of the supply. The operation during the second alternation is similar to that described for the first and it is evident that a continuous flow of current will be maintained through the cathode 4, thus keeping it excited. The functions of the resistances 14 and 15 are to prolong the flow of current from the condenser a long enough period so that the discharge current will exist in the cathode throughout the critical time.

In Fig. 2, I have shown a similar organization of circuits, the like numbered parts serving the same functions as in Fig. 1. In Fig. 2, however in place of the one-way devices 9 and 10 I show additional resistances 16 and 17 and instead of the resistances in the leads of the anodes 5 and 6 employed to prolong the condenser discharge, I locate resistances in series with the condensers as shown at 18 and 19. By this arrangement I obviate the necessity of using one way devices. The resistances 16 and 17 serve to throw the discharge from the condensers 7 and 8 through the anodes 5 and 6 to the cathode 4; while the resistances 18 and 19 serve to prolong the discharge of the condensers 7 and 8.

Fig. 3 shows a different combination of elements for producing the excitation of the cathode. In series with the storage battery which is here the work circuit, is a control means, which may be resistance or reactance 20, to which is connected a condenser 21, through the one-way device 22, which may be of the character of the previously described one-way devices. The junction point between devices 21 and 22 is connected through the resistance 23 to the supplemental anode 5. In operation, the effect of the main currents coming alternately from the anodes 2 or 3 will be to impress, during each alternation, an electro-motive force on the resistance 20 which will serve to cause the charging of the condenser 21 through the one-way device 22. On the dropping off of the current, however, in the resistance 20, the condenser 21 will tend to discharge current, which current cannot pass backward through the one-way device 22, but will traverse the resistance 23, the anode 5, the cathode 4, and the resistance 20 to complete its circuit, thus assisting the cathode in operation.

Fig. 4 operates the same way as Fig. 1, except that the inductances 24 and 25 replace the resistances 14 and 15. These inductances serve the function of the resistances 14 and 15 and do this more efficiently. They further tend to prolong the flow of current from the condenser 7 after the falling off of the main supply impulses. The work circuit in this figure is shown at 13$^a$.

The system of circuit shown in Fig. 5 is quite similar to that shown in Fig. 2, with the exception of certain features. For example, the work circuit 13$^b$ contains two storage batteries and an incandescent lamp in parallel, while the resistances 18 and 19 of Fig. 2 are omitted. The operation will be similar to that of Fig. 2 except for the obvious modifications resulting from the change of the system.

Fig. 6 shows a method of exciting the rectifier involving separate exciting sources shown at 26, 27. These may be the secondaries of transformers fed from the main supply, as shown. Condensers 28 and 29 are connected across the windings 26 and 27, resistances 30 and 31 being inserted in series with the said windings. Resistances or inductances 32, 33, connect the one side of the condensers 28 and 29 to two supplementary anodes, 5 and 6. In operation the winding 26 charges the condenser 28 through the resistance 30 and passes a flow of current at the same time through the resistance 32 and the anode 5, back to the cathode 4. When the voltage upon the winding 26 falls, the condenser 28 will discharge partly through the resistance 30 and the winding 26, but mainly through the resistance 32, the anode 5, and the cathode 4, thus keeping it alive during the discharge of the energy of the condenser 28. On the reverse alternation no current can flow between the electrodes 5 and 4, since the electromotive force then impressed is in the wrong direction. During the next alternation or half wave of the supply the winding 27, the condenser 29, and the resistances 31 and 33 repeat the operation just described and thus the second zero point is bridged. It is clear in both cases that the resistances 32 and 33 will prolong the discharge of the condenser 28 so that this discharge will persist after the complete cessation in electromotive force in the winding 26 or 27, as the case may be.

In Fig. 7 I have shown another embodiment in my invention wherein the parts 35, and 36 are condensers, 37 and 38 are resistances in series therewith, 39 is a resistance in series with the load 13, which may be a storage battery, and 40 and 41 are devices permitting the passage of current in but one direction only, as shown by the arrows. These may be similar to the parts 9 and 10 of Fig. 1. When electromotive force is impressed upon the right hand half of the supply winding 12, current will traverse the part 41, the anode 3, the cathode 4, resistance 39, the work circuit 13. At the same time current will be stored in the condenser 36 by the voltage upon the right hand half of the winding 12, which current will be discharged upon the falling of potential on the winding 12 and this discharge must occur through the rectifier between the anode 3 and the cathode 4, on account of the action of the device 41. During the next half wave the left hand half of the winding 12 produces a similar operation. The resistances 38 and 37 respectively serve to prolong the discharge of the condensers 36 and 35 respectively long enough to bridge the zero point of the apparatus.

In Fig. 8, I have shown a system similar to Fig. 6 except that one-way devices 42 and 43 are substituted for the resistances 30 and 31, and the resistances 44 and 45 are inserted between the condensers 46 and 47 and the cathode 4, while the resistances 32 and 33 are omitted. In this case I have shown a primary 48 supplying two secondaries 49 and 50 and constituting a part of the sustaining circuit. The one-way devices 42 and 43 prevent a backward discharge of the condensers 46 and 47, while the resistances 44 and 45 prolong the discharge sufficiently to bridge the zero point of the supply electromotive force.

Fig. 9 is very similar to Fig. 6, but in place of the resistances 30 and 31 I utilize one-way devices 51 and 52. Resistances 32 and 33 remain as in Fig. 6. This will be a more efficient and effective arrangement under many commercial conditions.

Fig. 10 shows still another circuit of this sort in which I utilize, in place of the devices 51 and 52, spark gaps or other devices, 53 and 54, permitting the passage of current in either direction, but only when a certain minimum voltage is exceeded. These devices would serve to force the discharge of the condensers 28 and 29 through the electrodes 5 and 6 respectively as the voltage falls below this minimum limit. This gives a simple and effective and economical exciting system.

In Fig. 11 I show still another system in which I use a single auxiliary anode, 55, and in parallel with the work circuit 13$^c$, showing a series motor and other translating devices, resistance 56 and resistance 57, in series with the condenser 58. The lead of the supplementary anode 55 is connected to the intermediate point between the resistances 56 and 57. As is well known, such a rectifier as here shown tends to impress a pulsating current upon the receiving circuit. Such a current will tend to charge and discharge the condenser 58, which condenser will discharge partly through the anode 55 in virtue of the resistance 56. The resistance 57 serves to prolong the discharge so that it may bridge the zero point of the supply.

Fig. 12 shows an arrangement similar to Fig. 11 except that a one-way device, 59, is substituted for the resistance 56 and a resistance is located in the lead of the anode 55, while the resistance 57 of Fig. 11 may, if desired, be omitted. The resistance 60 prolongs the discharge in condenser 58 to bridge the zero point, and the one-way device 59 permits the charging of the condenser through the cathode 4 and causes the discharge through the anode 55.

In Fig. 13 I show a modification of Fig. 12 which is useful in some cases. In this case the load 13$^D$ includes a storage battery or some other device of similar characteristics. To prevent the storage battery 13$^D$ from discharging, to maintain the potential on the condenser 58, I insert the one-way device 63 in the charging circuit of this storage battery in such a position that it will oppose the discharge through the condenser 58.

In Fig. 14 I have shown another arrangement for continuous excitation with two anodes, 76 and 77, by means of the condensers 82 and 83 and the resistances 84 and 85 and 88. Here transformer primary 87 feeds the secondary 86, the terminals of which are connected to the anodes 76 and 77 through resistances 84 and 85, while the intermediate point is connected to the lead of the cathode 4. The condensers 82 and 83 are connected respectively between the middle point of the secondary 86 and the terminals thereof. There is resistance 88 interposed between a common connection of the condensers 82 and 83 and intermediate point of the transformer secondary 86. In this system of circuits the condensers are charged by alternative half waves and discharged in turn through their respective anodes 77 and 76 to the cathode 4. The resistance 88 serves to control the discharging of condensers and force them through the anodes, while the resistances 84 and 85 serve to prolong a discharge over the zero point. In most conditions the resistance 88 would thus be considerably larger than either resistance 84 or 85.

Fig. 15 shows a modification of Fig. 14 in which the one-way devices 90 and 91 serve to control the discharge and the resistance 89 to prolong the flow sufficient to bridge the zero points.

In Fig. 16 I show still another modification of the circuits of Fig. 14. Here the one-way device 92 is placed in the lead of intermediate point of the secondary 86 and serves to prevent the discharge of the condensers 82 and 83 through the winding 86. The resistance 89 serves the same function as in Fig. 15.

In describing the above circuits, I wish it understood that I claim broadly the principles and novel apparatus set forth therein and do not wish to be specifically limited to the particular circuits shown, for there are many obvious variations thereof which serve to accomplish the same purpose in substantially the same way, which fall within my invention. Various modifications of circuits which I usually show in connection with but one main figure can obviously be applied to the structures of other figures, and it is my intention that where practicable they shall be so applied.

In the above circuits where I have shown a condenser in connection with sustaining circuits I may substitute a storage battery, where no obvious impracticability exists therefor, and I consider such a use of a storage battery to be often very desirable. For example, such a substitution may be made in Figs. 1, 2, 3, 4, 5, 7, 8, 9, 11, 12, 13, 14, 15 and 16. In such operation a storage battery receives energy at times of superior supply electro-motive force and will discharge this energy through the appropriate path at times when the supply falls below the normal battery voltage. These storage batteries have some marked advantages over the condensers in certain lines of work.

I claim as my invention:

1. In a system of electrical distribution, the combination with an alternating source, a work circuit, and a vapor rectifier including an exhausted container, a plurality of main anodes, a plurality of supplemental anodes, and a coöperating cathode therein, of electrostatic condensers connected each between the lead of a main anode and a supplemental anode, resistances in series with said condensers, and a resistance connected between the lead of each supplemental anode and the cathode.

2. In a system of electrical distribution, the combination of an alternating source, a work circuit, and a vapor rectifier comprising an exhausted container, main anodes, supplemental anodes and a coöperating cathode therein, of an energy storing device connected between the lead of each main anode and a supplemental anode and means permitting the charging of said device in shunt to said rectifier and for discharging said device through said cathode.

3. In a system of electrical distribution, the combination of an alternating source, a work circuit, and a vapor rectifier comprising an exhausted container, main anodes, supplemental anodes and a coöperating cathode therein, of energy storing devices having the property of discharging stored energy in a direction opposite to the flow of the charging energy and means for charging and discharging said devices for continuously exciting said rectifier.

4. The combination with a source of alternating current, a work circuit, and a vapor rectifier comprising an exhausted container and suitable anodes and a cathode therein, of one or more energy storing devices having the property of discharging stored energy in a direction reverse to that of the supply of energy and circuits for charging said devices and separate circuits including said cathode for discharging said devices.

5. The combination with a source of alternating current, a work circuit, and a vapor rectifier comprising an exhausted container and suitable anodes and a cathode therein, of one or more energy storing devices having the property of discharging stored energy in a direction reverse to that of the supply of energy and circuits for charging said devices and separate circuits including said cathode for discharging said devices, and means for prolonging the period of the natural discharge of said devices.

6. The combination with a source of alternating current, a work circuit, and a vapor rectifier comprising an exhausted container and suitable anodes and a cathode therein, of one or more energy storing devices having the property of discharging stored energy in a direction reverse to that of the supply of energy and circuits for charging said devices and separate circuits including said cathode for discharging said devices, and a resistance in the discharge path of each of said devices.

7. The combination with a source of alternating current, a work circuit, and a vapor rectifier comprising an exhausted container and suitable anodes and a cathode therein, of one or more energy storing devices having the property of discharging stored energy in a direction reverse to that of the supply of energy and circuits for charging said devices and separate circuits including said cathode for discharging said devices, and suitable resistances for prolonging the discharge of the devices.

8. In a system of rectification, the combination with a rectifier comprising an exhausted container, anodes and a coöperating cathode therein, a suitable supply and a work circuit, of exciting means for said rectifier, comprising energy storing devices having the property of producing a reversal of the direction of the flow of energy on discharge and two circuits for said device, one of said circuits traversing the cathode, and means for causing the discharge current from said devices to traverse the latter circuit, and means for causing the charging current to traverse the other circuit.

9. In a system of rectification, the combination with a rectifier comprising an exhausted container, anodes and a coöperating cathode therein, a suitable supply and a work circuit, of exciting means for said rectifier, comprising energy storing devices having the property of producing a reversal of the direction of the flow of energy on discharge and two circuits for said device, one of said circuits traversing the cathode, and means for causing the discharge current from said devices to traverse the latter circuit, means for causing the charging current to traverse the other circuit, and means for prolonging the discharge current beyond its natural time period.

10. The combination of a vapor rectifier including an exhausted container, and a plurality of anodes and a common cathode therein, means for exciting said rectifier, said means consisting of one or more energy storing devices having the property of discharging stored energy in a direction reverse to that of the supply, two circuits for said energy storing device and means for charging the device or devices through one of said circuits and discharging said device or devices through another of said circuits, including said cathode.

11. In a system of electrical distribution supplied from an alternating source and including a rectifier requiring excitation during periods of momentary supply deficiency, means for momentarily maintaining a flow of current in said rectifier, said means consisting of a source of alternating current, a condenser in shunt thereto, circuits permitting the charging of said condenser from said source and circuits for discharging said condenser through said rectifier.

12. In a system of electrical distribution supplied from an alternating source and including a rectifier requiring excitation during periods of momentary supply deficiency, means for momentarily maintaining a flow of current in said rectifier, said means consisting of a source of alternating current, a condenser in shunt thereto, circuits permitting the charging of said condenser from said source and circuits for discharging said condenser through said rectifier and means for prolonging the discharge of said condenser beyond the natural time period.

13. In a system of electrical distribution supplied from an alternating source and including a rectifier requiring excitation during periods of momentary supply deficiency, means for momentarily maintaining a flow of current in said rectifier, said means consisting of a source of alternating current, a condenser in shunt thereto, circuits permitting the charging of said condenser from said source and circuits for discharging said condenser through said rectifier and means for prolonging the discharge of said condenser beyond the natural period, said means consisting of a resistance in said discharge circuit.

14. A system of rectification utilizing a rectifier comprising an exhausted container, a plurality of anodes and a coöperating cathode therein, comprising a source of alternating current, connections for impressing said alternating current on said rectifier, an energy storing device in shunt to said source, said device having the property of discharging stored energy in a direction reverse to that of the supply, and circuits for charging said storage device directly from said source and means for causing the discharge thereof to traverse said rectifier.

Signed at New York in the county of New York and State of New York this 18th day of October A. D. 1911.

PERCY H. THOMAS.

Witnesses:
ALEXANDER BEGG,
THOS. H. BROWN.